Patented Mar. 9, 1954

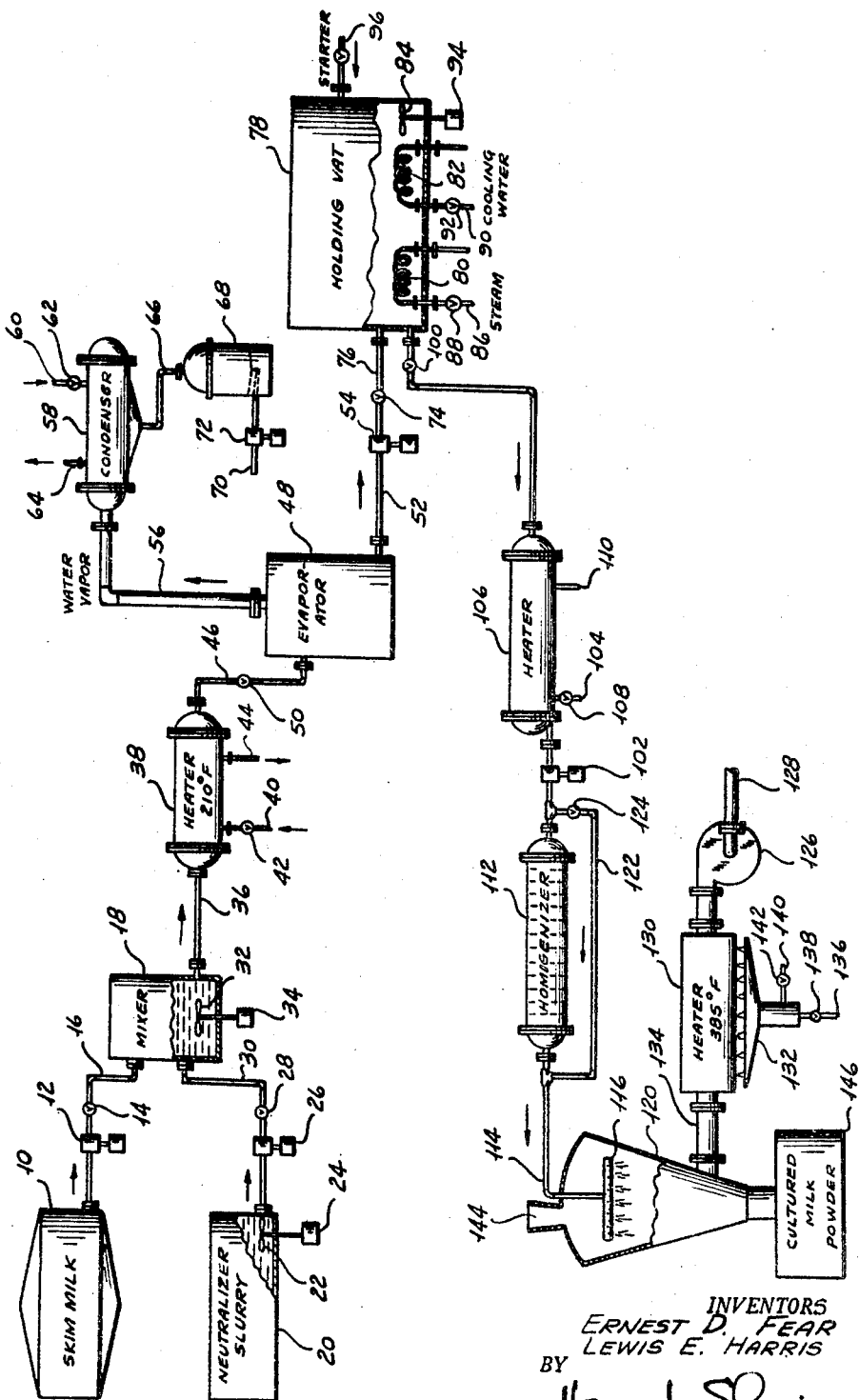

2,671,729

UNITED STATES PATENT OFFICE 2,671,729

CULTURED MILK POWDER AND METHOD OF MANUFACTURING SAME

Ernest D. Fear, Kansas City, Mo., and Lewis E. Harris, Lincoln, Nebr., assignors, by direct and mesne assignments, to De-Raef Corporation, Kansas City, Mo., a corporation of Missouri Application August 30, 1950, Serial No. 182,244

5 Claims. (Cl. 99—56)

Our invention relates to a cultured milk powder and method of manufacturing same.

Milk powders manufactured from dehydrated skim milk are well known to the art. They are used in baking and in the confection of frozen desserts such as ice cream, sherbets and the like. Milk powder is comparatively labile and does not keep well over extended periods of time.

We have discovered that we are able to manufacture a milk powder having vastly improved keeping qualities so that it will not deteriorate in storage, which is useful in the confection of frozen comestibles such as ice cream and sherbets, and which can be used for pancake mixes, waffles, doughnuts and the like, to give them a piquant and pleasing flavor. We have also discovered that by using our cultured milk powder in an ice cream mix we can eliminate the use of stabilizers such as gelatin and the like and yet obtain ice cream of improved flavor and of a much stiffer consistency.

One object of our invention is to provide a novel method of manufacturing a cultured milk powder.

Another object of our invention is to provide a novel cultured milk powder of improved keeping qualities.

Other and further objects of our invention will appear from the following description.

The accompanying drawing, which forms part of the instant specification and which is to be read in conjunction therewith, is a diagrammatic view showing one form of apparatus capable of carrying out the process of our invention and capable of manufacturing the cultured milk powder of our invention.

In general, our invention contemplates reducing the acidity of skim milk to a predetermined standard point, heating the standardized skim milk, then flashing it in an area of reduced pressure to evaporate moisture from the skim milk to form a condensed milk. The condensed milk is then inoculated with a lactic acid-producing bacillus normally used for producing a cultured buttermilk in a holding vat until a predetermined lactic acid content is developed. The cultured condensed milk is then heated and homogenized, if desired, and powdered by means of a spray drying process. The resulting product will have a pleasing aroma and a full-bodied "buttermilk-like" taste and is the product of our invention.

More particularly referring now to the drawing, skim milk from a storage vat 10 is pumped by pump 12 past valve 14 through pipe 16 into a mixer 18. The acidity of the milk varies from .12% to .18% calculated as lactic acid. For purposes of convenience, whenever acidity is referred to in the instant specification in percent we mean total acidity calculated as lactic acid.

A slurry is formed in tank 20 from water and either calcium hydroxide or magnesium oxide or a mixture of the calcium hydroxide and magnesium oxide. About three hundred pounds of these compounds are mixed in tank 20 with two hundred gallons of water. An agitator 22 driven by motor 24 forms a smooth pumpable slurry. This slurry is pumped by pump 26 past control valve 28 through pipe 30 into the mixer 18, in which the slurry is thoroughly mixed with the skim milk by means of agitator 32 driven by motor 34. The valves 14 and 28 are so adjusted that a proper amount of slurry is fed to the mixer 18 with the skim milk entering through pipe 16 in order that the acidity of the milk be reduced to a point that the condensed milk will have an initial acidity of about .05% before inoculation with the lactic acid-producing culture. In theory, it would be desirable to reduce the acidity to zero. In practice, however, we have found that if this is attempted, the product frequently becomes so thick and viscous that it cannot be pumped without introducing pumping problems. The mixture of calcium hydroxide and magnesium oxide has a thickening effect upon the skim milk, increasing its viscosity besides reducing its acidity. It apparently deflocculates the casein in milk and increases its colloidal properties.

Under the pressure of the pumps 12 and 26 the standardized skim milk leaves the mixer 18 through pipe 36 and passes through a heater 38 into which steam is passed in heat exchange with the standardized skim milk. The flow of steam through pipe 40 is controlled by valve 42 such that the temperature of the preheated skim milk leaving the heat exchanger 38 through pipe 46 will be in the vicinity of 210° F. Temperatures between 200° F. and 220° F. may be used. A temperature of over 210° F. has a tendency to cause a slight "browning" of the condensed milk. The condensate is withdrawn from the heat exchanger through pipe 44. The flow of the preheated standardized skim milk into a flash evaporator 48 is controlled by valve 50. The condensed milk is being continually pumped from the evaporator 48 through pipe 52 by pump 54. The evaporated moisture passes through pipe 56 to a container 58 to which cooling water is passed through pipe 60 controlled by valve 62 for heat exchange with the water vapors entering the condenser. The cooling water passes from the condenser 58 through pipe 64. The condensate flows through pipe 66 into a separator 68 and is pumped therefrom through pipe 70 by pump 72. The continual removal of the condensate by pump 72, plus the reduction in pressure produced by the condensing of the vapors in the condenser 58, plus the removal of the condensed milk by pump 54, maintains an area of reduced pressure within the evaporator 48, enabling a continuous flashing off of vapors to take place. This partial dehydration is not critical, since any moisture not removed in the evaporator 48 will be removed during the spray-drying process. We have found, however, that the reduction in pressure in the evaporator 48 should be such as to produce a condensed milk of maximum thickness to be conveniently pumped for the reason that the inoculation of the condensed milk will produce a much higher lactic acid content than if skim milk were inoculated with a lactic acid-producing culture. Ordinary cultured buttermilk, which is produced by inoculating a skim milk with a lactic acid-producing culture, does not have an acidity of over 0.9%. If it is attempted to make a buttermilk more acid than this, difficulties are encountered and there is a flocculation or curding of the casein components of the milk. When the condensed skim milk is inoculated with a lactic acid bacillus we find we are enabled to build up a lactic acid content of well over 2% without experiencing difficulties. The addition of the neutralizer comprising magnesium oxide or calcium hydroxide, or both, however, has a thickening effect so that the removal of moisture in the evaporating stage 48 cannot be carried on too far since a very viscous condensed milk would then be produced which cannot be pumped without difficulty.

The pump 54 passes the condensed skim milk past valve 74 through pipe 76 into a holding vat 78. The holding vat is provided with a heating coil 80, a cooling coil 82 and an agitator 84. Steam is passed to the heating coil 80 through pipe 86 which is controlled by valve 88. Cooling water is passed through coil 82 through pipe 90 which is controlled by valve 92. The agitator 84 is driven by motor 94. The holding vat 78 is provided with an insulating jacket. The standardized condensed skim milk is cooled initially to a temperature between 80° F. and 85° F. by means of the cooling coil 82.

Before the above steps occur, a suitable lactic acid bacillus culture normally used for buttermilk production is employed to make a starter. A quantity of fresh skim milk is inoculated with a freshly propagated culture about eighteen hours before the starter is required. It takes about twelve hours to develop an acidity in the cultured fresh skim milk between .75% and .80% at an incubating temperature of between 70° F. and 72° F. After twelve hours the starter will have a pleasant aroma and flavor and the containers in which the starter has been prepared are cooled and stored at about 45° F. until ready for use. It is important that the starter be freshly prepared and used within twenty-four hours after its initial inoculation and that the bacillus be freshly propagated and that the culture be virile. It is also important that the inoculum be of a satisfactory aroma and flavor and devoid of "off" flavors or aromas. It is also important that the inoculated fresh skim milk in the production of the starter be incubated for not more than twelve hours and that the fresh skim milk be of good quality and that the finished bulk culture be promptly cooled and stored. While the bulk culture thus prepared may be used within six to ten hours after its preparation, it is preferable that it be used much sooner than this. The quality of the culture has a wide-reaching effect on the quality of the end product, and batches can be spoiled if these precautions in the propagation and preparation of the starter are not followed.

The quantity of the culture may vary within wide limits. We have found that three hundred gallons of properly prepared starter are sufficient for a batch of between one hundred thousand to two hundred thousand pounds of skim milk. Two hundred gallons of starter are sufficient for batches between fifty thousand and one hundred thousand pounds of skim milk. With over two hundred and fifty thousand pounds of skim milk between three hundred and fifty and four hundred gallons of starter are employed.

As soon as the process starts and the standardized condensed milk begins to flow through pipe 76 into the holding vat 78 the entire quantity of starter is added to the vat and the agitator 84 started. The starter may be poured into the vat 78 or pumped into it through pipe 96. The agitation is continued all during the flow of the standardized condensed milk into the vat. The rate of flow is such that approximately ten hours are required for about two hundred thousand pounds of skim milk. This will vary, of course, depending on the size of the batch and the viscosity of the condensed milk. Agitation is stopped as soon as all of the condensed milk has been pumped into the vat. During this process the temperature of the vat is maintained between 70° F. and 72° F. by means of the cooling coil 82. If the temperature drops below this due to excessive cooling, heat may be added by means of the heating coil 80. It is important that the temperature of 72° F. be not substantially exceeded and that the agitator 84 be continuously operated during this period. As soon as a minimum acidity of 1.50% is reached, the cooling rate is increased by speeding up the flow of cooling medium through the cooling coil 82 and the valve 100 is opened. The pump 102 is started and steam is introduced through pipe 104 through the heat exchange coils positioned within heat exchanger 106. The flow of the steam is controlled by valve 108 to give a temperature between 110° F. and 180° F. The condensate is withdrawn from the heat exchanger through pipe 110. It will usually be found that the minimum acidity of 1.50% will be reached about the time the last of the condensed milk has been added to the vat 78 or shortly thereafter. The first product withdrawn from the vat, therefore, will have an acidity of about 1.5%. By the time the vat is emptied and the spray-drying process has been completed, the last portion of the condensed milk will usually have an acidity between 1.9% and 2.1%.

The preheater 106 heats the cultured condensed milk to a temperature between 110° F. and 180° F. The pump 102 forces the preheated cultured condensed milk through a homogenizer 112 through pipe 114 to the spray head 116 within the spray-drier casing 120. The cultured condensed milk is under the pressure of the pump passing it to the homogenizer. The agitation incident to pumping keeps the cultured condensed milk smooth so that the homogenizer 112 may be by-passed by by-pass line 122 by opening valve 124. In practice, we find that we may by-pass about three-quarters of the cultured condensed milk and homogenize about one-quarter of it in the homogenizer 112. The homogenized portion and the by-passed portion are blended in pipe 114 passing through the spray nozzle 116.

A blower 126 takes air through pipe 128 and blows it through a heater 130 which is heated by a fuel burner 132 to give the air leaving the heater through duct 134 a temperature of 385° F. Fuel is supplied to the burner 132 through pipe 136 controlled by valve 138, and air is supplied to the burner through pipe 140 controlled by valve 142. The heated air passes into the drying cone at a temperature of 385° F. upwardly countercurrent to the sprayed, cultured homogenized condensed milk and evaporates the residual moisture therefrom. The air and the moisture pass upwardly and outwardly from the drying cone 120 through the pipe 144. The cultured milk powder is collected in a suitable container 146.

It will be found that the finished powder is white with a very light tan shade and has a clean, sharp, acid taste and a pleasing aroma. The acid taste is a full-bodied "buttermilk-like" taste.

An illustrative run will illustrate the actual working of the process. We used one hundred eight-seven thousand pounds of skim milk and used one thousand one hundred pounds of a mixture of magnesium oxide and calcium hydroxide to neutralize the skim milk. This neutralizer gave a lactic acid content to the standardized skim milk passing through pipe 36 to the heater 38 of .04%. The preheater was operated at a temperature of 210° F. The initial portion of the standardized condensed milk in the holding vat was cooled to 65° F. before the addition of the culture. We employed three hundred gallons of the starter using a lactic acid bacillus repropagated twice. The prepared starter had been cooled to a temperature of 45° F. and held for a period of two hours after preparation before being added. As soon as the starter was added, the temperature in the holding vat was increased to between 70° F. and 72° F. and maintained within this range. After a period of ten hours the last of the standardized condensed milk had been passed to the holding vat and the contents of the holding vat had an acidity of 1.5% as lactic. Spray-drying was immediately begun. The heated air to the cone drier had a temperature of 385° F. The preheater 106 was operated at a temperature of 110° F. A yield of eighteen thousand pounds of finished cultured milk powder was obtained.

In the spring the character of skim milk is such that if a quantity of neutralizer of eight hundred pounds per one hundred thousand pounds of skim milk is used the skim milk will become so thick that it is difficult to handle in the evaporator 48. Accordingly, the quantity of neutralizer must be reduced to about seven hundred pounds per one hundred thousand pounds of skim milk. By summer, however, the character of the raw milk becomes so changed that it can be neutralized to a greater degree, and eight hundred pounds of neutralizer to one hundred thousand pounds of skim milk can be used without difficulty. The illustrative run outlined above was made the last week in June, so that it could be neutralized to a low point of acidity.

The finished cultured milk powder had the following analysis, which, when applicable, was made in accordance with the standard methods of the Association of Official Agricultural Chemists:

| | Per cent |
|---|---|
| Moisture | 2.90 |
| Ash | 8.05 |
| Protein (N×6.25) | 33.10 |
| Fat | 0.70 |
| Crude fiber | 0.60 |
| Total reducing sugars, calculated as lactose | 54.65 |
| | 100.00 |

| | |
|---|---|
| Total carbohydrate, including crude fiber _____per cent__ | 55.25 |
| Calories per gram | 4.01 |
| Calories per pound | 1821.60 |
| Total bacteria per gram | 12,000 |
| Total acidity, calculated as lactic per cent__ | 3.92 |
| Solubility _____do____ | 99.20 |

It will be observed that a lactic acid content in the cultured condensed milk between 1.5% and 2% gives a total acidity in the cultured milk powder of almost 4%. The lactic acid content of the finished milk powder can be controlled very easily by adjusting the content of lactic acid in the inoculated condensed milk. By holding the condensed milk in the holding vat until the acidity reaches 1.75%, the lactic acid content of the finished milk powder will be in the vicinity of 4.5%. By chilling the condensed inoculated milk after the acidity reaches 1.5%, the lactic acid content of the finished milk powder may be reduced to 3.5% or less. An optimum lactic acid content in the finished milk powder appears to be about 4% or slightly less, though it may vary between 3.5% and 4.5%. At the higher range of acidity an exceptionally pure culture must be used if a "yeasty" or "off" taste is to be avoided. We have found that it is safer not to exceed 2% by very much in the final acidity of the last portion of the condensed inoculated milk.

The finished powder has many uses. Two percent to three percent may be added to an ice cream mix. Bacterial cultures have been used for many years to produce desirable and distinctive flavors in cheese, butter and fermented milks. These flavors are not due to the mere presence of the lactic acid-producing organisms themselves, but to compounds formed in their metabolism. When 2% to 3% of our cultured milk powder is added to an ice cream mix it will give a distinctive flavor to the ice cream, which will have a smooth body, a close texture and a clean, pleasant taste. The use of the cultured milk powder enables gelatin or other stabilizers to be dispensed with or reduced in quantity. Ice cream made with the cultured milk powder shows a relative increase in stability without making it too resistant to proper melting. The improvement in body and texture and increase in stability may be due to the presence of the magnesium oxide and calcium hydroxide in the cultured milk powder. The cultured flavor becomes more pronounced in ice creams having a low total solids content. An increase in the butter fat content of the mix will also tend to submerge or temper the cultured taste. The addition of our cultured milk powder to an ice cream mix decreases the amount of apparent foam during the process of freezing the ice cream.

The addition of our cultured milk powder instead of ordinary milk powder in pancake mixes, waffle mixes and doughnut mixes, and the like, produces pancakes, waffles and doughnuts having a very pleasant and unusual taste.

The remarkable result, however, of our process and unexpected quality of our product is its unusual keeping qualities. The instability of ordinary milk powder is well known to the art. We have been able to keep a portion of our first batch, made experimentally, for a period of eighteen months, and find that there has been no sign of loss of flavor or deterioration of quality of our cultured milk powder after this period of time even though the product was packed in a fiber drum with metal ends and no unusual precautions were taken to preserve the powder. We are not sure just how long our cultured milk powder will keep since the first batch is still in excellent condition after eighteen months.

It will be seen that we have accomplished the objects of our invention:

We have provided a process of manufacturing a cultured milk powder and have provided a novel cultured milk powder of improved keeping qualities. We do not know the exact reason why our cultured milk powder has the good keeping qualities it exhibits. It may be that the high acidity of the cultured milk powder arrests the development of bacteria or other micro-organisms which ordinarily serve to deteriorate milk powder. It may be that the high acidity of the cultured milk powder interferes with natural enzymatic processes. In addition, the use of the preheater in condensing the milk before inoculation reduces the total bacteria count of naturally present bacteria and thus reduces the possibility of bacterial decomposition in the finished product. Furthermore, the partial removal of moisture in the condensing process before inoculation with the culture enables the spray-drying process to be speeded up. This greatly reduces the danger of a caramelized flavor and also minimizes oxidation during the spray-drying process. Furthermore, the development of a high acidity in the condensed standardized milk in a short period of time may produce as by-products certain elements unknown to us which may account for the keeping qualities of the finished product. While we are not certain why our cultured milk powder has improved keeping qualities, the fact remains that it has.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A method of making a lactic acid-bearing milk powder including the steps of reducing the acidity of milk, condensing the treated milk to thicken the same while retaining convenient pumpability, inoculating the condensed milk with lactic acid-producing bacilli, holding the inoculated condensed milk at a bacillus-propagating temperature until the condensed milk has a lactic acid content in the vicinity of 1.5% and then dehydrating the lactic acid-containing condensed milk to produce a lactic acid-bearing milk powder.

2. A method of making a lactic acid-bearing milk powder including the steps of reducing the acidity of skim milk with a neutralizer selected from the class consisting of magnesium oxide or calcium hydroxide, condensing the treated milk to thicken the same while retaining convenient pumpability, inoculating the condensed treated milk with a lactic acid-producing culture, holding the inoculated condensed milk at a lactic acid-producing bacillus-propagating temperature until the lactic acid content of the condensed milk reaches the vicinity of 1.5%, heating the lactic acid-containing condensed milk, homogenizing the heated lactic acid-containing condensed milk and then dehydrating the lactic acid-bearing condensed milk by the spray process to form a lactic acid-bearing milk powder.

3. A method of making a lactic acid-bearing milk powder including the steps of reducing the acidity of skim milk by means of a neutralizer selected from the class consisting of magnesium oxide or calcium hydroxide, heating the partially neutralized skim milk to a temperature in the vicinity of 210° F., flashing the heated partially neutralized skim milk in a zone of reduced pressure to separate a portion of the water contained in the skim milk to thicken the same while retaining convenient pumpability, removing the water vapor from the evaporating zone, removing the neutralized condensed milk from the evaporating zone, reducing the temperature of the condensed milk in a holding zone, inoculating the condensed milk in the holding zone with a lactic acid-producing culture, maintaining the temperature of the inoculated condensed milk in the holding zone in the vicinity of 70° F. until the lactic acid content of the condensed milk reaches the vicinity of 1.5%, withdrawing the lactic acid-bearing condensed milk from the holding zone, heating the withdrawn lactic acid-bearing condensed milk, homogenizing the heated lactic acid-bearing condensed milk and spraying the heated homogenized lactic acid-bearing condensed milk in contact with a current of air heated to the vicinity of 385° F. to produce a lactic acid-bearing milk powder.

4. A lactic acid-bearing milk powder comprising a spray-dried powder formed by inoculating a thickened skim milk which has been condensed by evaporating a portion of the water therefrom while retaining convenient pumpability with a culture of lactic acid-producing bacillus, permitting the culture to increase the lactic acid content of the condensed inoculated milk to at least 1.5% and then forming a milk powder from the cultured condensed milk by the spray process, the finished milk powder containing in the vicinity of 4% by weight of lactic acid.

5. A lactic acid-bearing milk powder formed by reducing the acidity of milk to a substantially neutral point by a neutralizer selected from the class consisting of magnesium oxide and calcium hydroxide, condensing the neutralized milk to thicken the same while retaining convenient pumpability, inoculating the neutralized condensed milk with a lactic acid-producing culture, holding the inoculated neutralized condensed milk at a culture-propagating temperature until its lactic acid content has reached at least the vicinity of 1.5% by weight, homogenizing the cultured condensed neutralized milk and spray-drying the homogenized cultured condensed neutralized milk to form a milk powder having a lactic acid content of between 3.5% and 4.5% by weight.

ERNEST D. FEAR.
LEWIS E. HARRIS.

References Cited in the file of this patent

UNITED STATES PATENTS

| Number | Name | Date |
| --- | --- | --- |
| 1,957,555 | Reichel et al. | May 8, 1934 |
| 1,985,490 | Farr | Dec. 25, 1934 |
| 2,128,845 | Myers et al. | Aug. 30, 1938 |
| 2,374,427 | Fear | Apr. 24, 1945 |

OTHER REFERENCES

"Condensed Milk and Milk Powder," by O. F. Hunziker, 6th ed., pub. 1946 by the author, La Grange, Illinois, pages 271-282, 399-406.